(12) United States Patent
Deriaz

(10) Patent No.: US 7,955,020 B2
(45) Date of Patent: Jun. 7, 2011

(54) GROOVED PROFILE FOR A HUB SHAFT CONNECTION

(75) Inventor: Daniel Deriaz, Meilen (CH)

(73) Assignee: Ernst Grob AG, Maennendorf (CH)

( * ) Notice: Subject to any disclaimer, the term of this patent is extended or adjusted under 35 U.S.C. 154(b) by 517 days.

(21) Appl. No.: 11/570,581

(22) PCT Filed: Jun. 14, 2004

(86) PCT No.: PCT/CH2004/000357
§ 371 (c)(1),
(2), (4) Date: Dec. 13, 2006

(87) PCT Pub. No.: WO2005/121581
PCT Pub. Date: Dec. 22, 2005

(65) Prior Publication Data
US 2008/0277934 A1 Nov. 13, 2008

(51) Int. Cl.
*B25G 3/28* (2006.01)
*F16D 3/18* (2006.01)
(52) U.S. Cl. .................. 403/359.6; 464/158
(58) Field of Classification Search .......... 403/359.1, 403/359.2, 359.6; 464/154, 156, 158
See application file for complete search history.

(56) References Cited

U.S. PATENT DOCUMENTS

| | | | | |
|---|---|---|---|---|
| 2,015,430 A | * | 9/1935 | Matthews et al. | 464/179 |
| 2,682,760 A | * | 7/1954 | Shenk | 464/154 |
| 3,383,882 A | * | 5/1968 | Smirl | 464/162 |
| 4,125,000 A | * | 11/1978 | Grob | 464/162 |
| 4,838,832 A | | 6/1989 | Schmitt et al. | |
| 5,243,874 A | | 9/1993 | Wolfe et al. | |
| 5,503,494 A | * | 4/1996 | Kamata et al. | 403/359.6 |
| 5,660,494 A | * | 8/1997 | Schwarzler et al. | 403/359.6 |
| 5,664,655 A | * | 9/1997 | Oh | 192/70.2 |
| 5,720,102 A | | 2/1998 | McClanahan | |
| 5,779,551 A | | 7/1998 | Stall et al. | |
| 6,193,612 B1 | * | 2/2001 | Craig et al. | 464/162 |
| 6,623,202 B2 | * | 9/2003 | Hansson et al. | 403/359.6 |
| 6,634,078 B1 | * | 10/2003 | Breese | 29/527.2 |
| 7,160,195 B2 | * | 1/2007 | Lyon | 464/179 |
| 2006/0291954 A1 | * | 12/2006 | Igarashi et al. | 403/359.1 |
| 2007/0104535 A1 | * | 5/2007 | Valovick | 403/359.1 |
| 2007/0183844 A1 | * | 8/2007 | Steinrisser | 403/359.1 |

FOREIGN PATENT DOCUMENTS

| | | |
|---|---|---|
| DE | 3635916 | 3/1988 |
| WO | 96/05101 | 2/1996 |

* cited by examiner

*Primary Examiner* — Joshua T Kennedy
(74) *Attorney, Agent, or Firm* — Greenblum & Bernstein, P.L.C.

(57) ABSTRACT

A grooved profile for a form fitting hub-shaft connection in which a groove profile for a hub and a shaft include flanks which are structured and arranged as opposing flanks. The groove profile includes a groove profile height in at least one of the hub and the shaft, a wall thickness in at least one of the hub and the shaft smaller than the groove profile height, and at least one of the opposing flanks is one of curved and arc-shaped in cross section.

28 Claims, 2 Drawing Sheets

Fig. 4  a)  b)  c)

GROOVED PROFILE FOR A HUB SHAFT CONNECTION

CROSS REFERENCE TO RELATED APPLICATIONS

The present application is a U.S. National Stage Application of International Application No. PCT/CH2004/000357 filed Jun. 14, 2004, which published as WO 2005/121581 A1 Dec. 22, 2005, the disclosure of which is expressly incorporated by reference herein in its entirety.

BACKGROUND OF THE INVENTION

1. Field of the Invention

The present invention relates to a grooved profile for a form fitting hub-shaft connection with essentially trapezoid cross-section of the toothing profiles both of the hub and the shaft, such that the wall thickness at least in the region of the toothing profiles is smaller than the difference between the tip diameter and the base diameter of the toothing profile. Additionally, the present invention relates to a telescopic pipe for articulated shafts with an inner pipe and an outer pipe, such that the inner pipe or the outer pipe have the above-noted grooved profile. Further, the present invention relates to a process for the manufacture of the above-noted grooved profile.

2. Description of Background Information

Fitting keys or slide keys are often used for the form fitting connection between a hub and a shaft. When large amounts of torque are to be transferred and an axial movement between hub and shaft is to be guaranteed, as for example in articulated shafts, a multi-groove profile or a multi-wedge shaft is often used.

The grooves thereby often have either a rectangular or trapezoid profile. The profiles are produced either by machining or cold forming, for example by impact rolling processes. Compared to the machining, cold forming has the advantage to be more economical for the production in high quantities.

Such grooved profiles are used, for example, for clutch disc carriers for automatic vehicle transmissions or for articulated shaft telescopic pipes, which are used in large numbers, for example, in motor vehicle production. An inner and outer pipe with corresponding grooved profiling on the outside or inside is thereby respectfully used. Because of the large quantities required, the cold-forming process is of large interest for economical production, but the high rotation speed and load on articulated shaft telescopic pipes during operation requires a high accuracy of the profile connection between the inner and outer pipe.

Not only must the largest possible area connection between the two profiles of the pipes be created for the transfer of large amounts of torque, but a very good centering of the two pipes must also be guaranteed for the achievement of high rotation speeds.

SUMMARY OF THE INVENTION

It was therefore an aim of the present invention to find a groove profile (toothing profile) for drive components, especially for mutually, slideably constructed telescopic pipes, which during operation guarantees a possibly optimal force transfer with quiet running properties.

According to the invention, a groove (or toothing) profile for a form fitting hub-shaft connection includes respectively one of the two opposing flanks of the profiles of the hub and the shaft being curved or arc shaped in cross-section. Further, preferred embodiments in accordance with the invention result from the features recited in the pending claims.

In a grooved profile in accordance with the invention for a form-fitting hub-shaft connection with essentially trapezoid cross-sections of the groove profiles of the hub as well as the shaft, whereby the wall thickness, at least in the region of the groove profile, is smaller than the difference of the tip diameter and the base diameter of the groove profile, at least one of the two facing flanks of the profile of the hub and the shaft is curved or arc shaped in cross-section.

This construction of the flanks in accordance with the invention results during operation under load in a continuous mutual nestling of the flanks. Starting from a rather minor contact length in cross-section, a contact length extending in cross-section over a significant portion of the profile height is generated with increasing load, caused by the torque to be transferred, as a result of elastic deformation of the mutually engaging flanks. Taking into account the axial extent of the groove profile, a large area, well-centered connection advantageously results therefrom and an increase in the load capacity and quietness is achieved thereby.

The curvatures of both flanks in cross-section are thereby convex or arcuate in the same direction.

Preferably, the curvatures of the inner flanks of the hub are concave and the curvatures of the outer flanks of the shaft are convexly shaped.

The curved flank contour results on the one hand, as already discussed, in snug contact of the flanks under load and thereby a distribution of the load over an area and on the one hand a very good centering effect and quietness is advantageously achieved thereby.

The curvatures are preferably arcuate in cross-section and extend preferably at least over 50 to 75% of the respective profile height. A connection over an area between the profile cross-sections or the mutually opposing flanks of the shaft or hub is thereby achieved during operation even at higher loads, for example during transfer of high torque and/or high rotation speeds of the hub-shaft connection.

The centers of the arc of the curvatures of facing flanks are thereby preferably either located in the same point or radially spaced apart or spaced apart with any desired offset. When the arc centers are concentrically positioned, an approximately constant play, and thus constant spacing, is achieved in the at rest condition between two mutually facing surfaces of the groove profile cross-sections. When the centers are positioned spaced apart along a common radius of the two arc shapes, a minimal play is achieved in the region of the median profile height and a maximum play at the two ends of the profile height. The areal contact of the two flanks during operation will thereby generally also occur at the median profile height, whereby the contact surface upon an increase in load will increase roughly equally inwardly and outwardly. When the centers are arbitrarily spaced from one another, the minimal play is located either inwardly or outwardly shifted in relation to the center axis of the shaft or the hub. The contact point or contact surface will be correspondingly formed at that location during operation. A dependency on the requirements on the articulated shaft, a further inward or further outward located contact can be advantageous. It can be controlled or adjusted by corresponding selection of the geometry of the curvature.

Preferably, a constant play exists between facing flanks of the shaft and the hub, or a play which changes along a flank, preferably at minimum 0.02 mm and at maximum 0.1 mm. An optimum groove profile of shaft and hub for a telescopic shaft results with these values, whereby the flanks of all groove profiles are always in contact with one another at the circumference during operation.

Further, according to the invention a telescopic pipe for articulated shafts includes an inner pipe and an outer pipe, such that at least the inner pipe or the outer pipe have a grooved profile including the above-noted features of the invention.

The inner pipe and the outer pipe are thereby preferably constructed as hollow bodies with approximately even wall thickness. Such articulated shafts are especially suited for use in motor vehicles for torque transfer from the transmission to the drive shafts or wheels.

The invention further provides a process for the manufacture of a grooved profile including the above-noted features of the invention by a cold rolling process, whereby one or more profiled rolls or profiled rollers with a profiled cross-section formed according to the grooved profile are brought into engagement with the surface of the hub or shaft. The profile can thereby be preferably manufactured in one process step. The profiled rolls or profiled rollers are thereby preferably brought into a periodically striking engagement. Especially precise profilings can be produced on thin walled pipes with this impact rolling process.

BRIEF DESCRIPTION OF THE DRAWINGS

An exemplary embodiment of the present invention will be further described in the following with reference to the drawings. It is shown in:

FIGS. 4a to 4c—schematically the run of opposing curvatures of the grooved profiles according to FIG. 2 in three different variations.

DETAILED DESCRIPTION OF THE INVENTION

Figure 1:
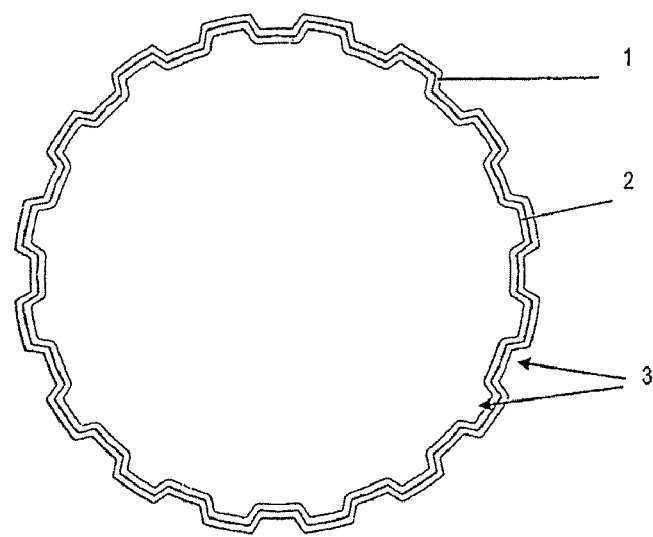
FIG. 1—the cross-section through telescopic pipe with hub and shaft with a grooved profile.

FIG. 1 illustrates the cross-section through the hub or outer pipe 1 and shaft or inner pipe 2 of the telescopic pipe constructed as a hollow profile, as used, for example, in vehicle construction. The outer pipe 1 as well as the inner pipe 2 thereby have a grooved profile with grooves 3 of essentially trapezoid cross-section positioned evenly along the outer circumference.

Figure 2:
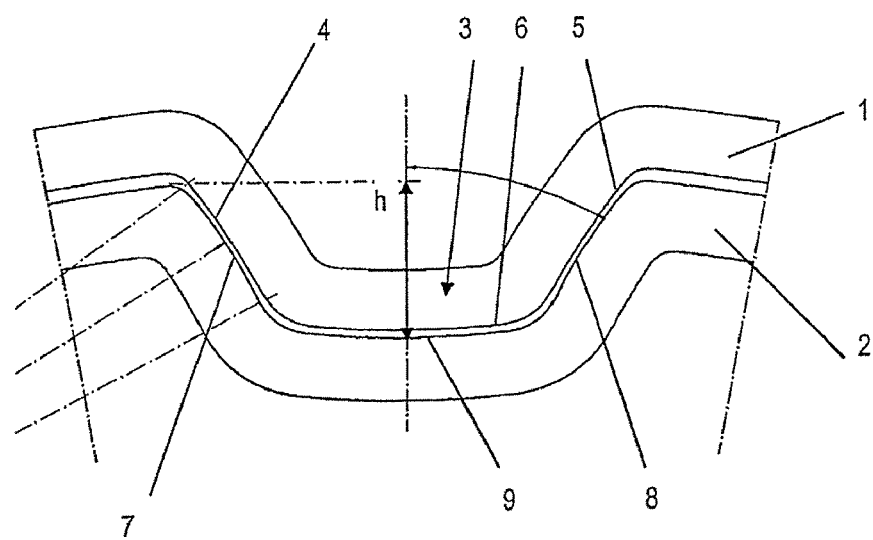
FIG. 2—the cross-section through a portion of the telescopic pipe with hub and shaft with a grooved profile in accordance with the inventions.

FIG. 2 shows in more detail a portion of an individual groove profile formed in accordance with the invention of the telescopic pipe according to FIG. 1. The outer pipe 1, having a wall thickness, is provided with a groove 3 of essentially trapezoid cross-section with flanks 4 or 5, which are concavely curved towards the inside. The groove head 6 advantageously has a convex curvature towards the inside of the profile.

The inner pipe 2 has a wall thickness and is provided with a groove to correspond to the groove of the outer pipe 1, but the shaped cross-section includes a flank 7 or 8 curved convexly to the outside. Additionally, the inner pipe 2 has a groove height h. The groove base 9 is advantageously concavely curved. As is shown in FIG. 2, the groove height h is the difference between a groove tip diameter and a groove base diameter.

Because of this geometry, the grooves 3 of inner pipe 1 and outer pipe 2 have a gap between their flanks. Due to same orientation of the curvature of the flank surfaces 4 and 7 or 5 and 8 of the grooves of inner pipe 1 and outer pipe 2, respectively opposing groove surfaces will in cross-section initially engage almost at a point, whereby upon increasing load or increasing rotational speed, because of an increase in the force transmitted at that location, a small elastic deformation of the corresponding flank surfaces occurs. This elastic deformation leads to a linear extension of the engagement of the two flank surfaces 5 and 8 or 4 and 7 in cross-section. The increase of the incremental surface compression is thereby avoided and the permissible surface load is not exceeded, even at high rotation speeds and high forces at high-transmitted torque. As a further advantage, an areal, well centered contact between inner pipe and outer pipe is achieved under load.

Figure 3:
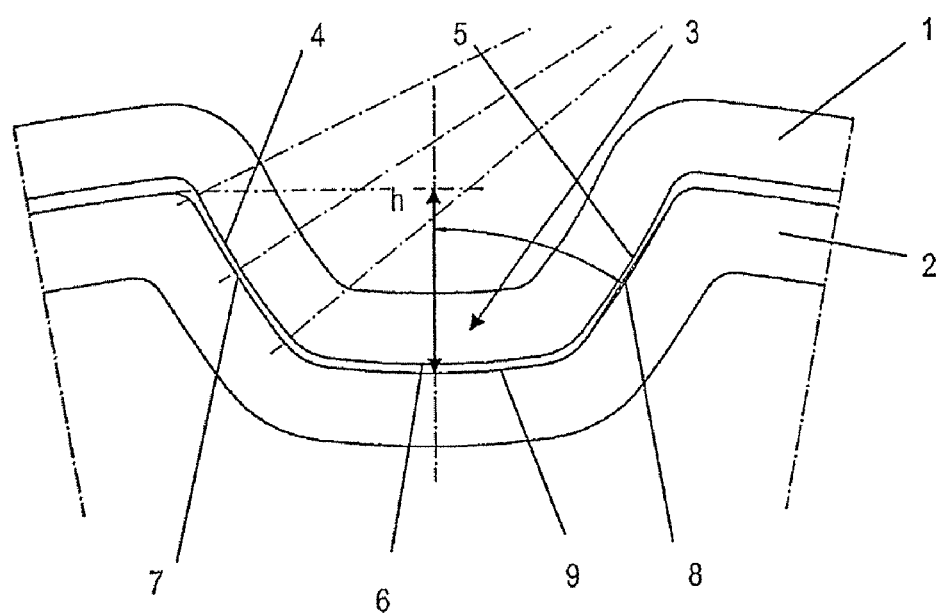
FIG. 3—the cross-section through the portion of a further telescopic pipe with hub and shaft with an alternative grooved profile in accordance with the invention.
Figure 3:
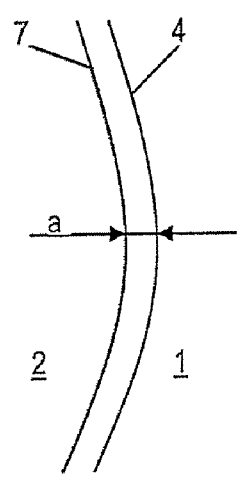
Figure 3:
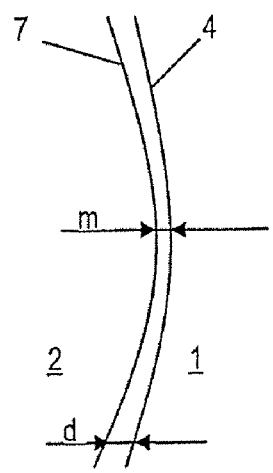
Figure 3:
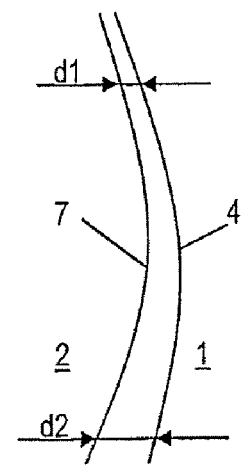

The same effect can of course also be achieved when the curvatures of the flank surfaces 4, 5 or 7 or 8 are positioned inversely, as illustrated in FIG. 3.

Alternatively, only one of the flank surfaces can have a curvature, while the other flank surface has a linear contour. This can be advantageous especially for thick walled pipes or shafts, or for shafts of solid material.

Alternative curvatures of opposing flank surfaces 4 and 7 are schematically illustrated in FIGS. 4a to c.

FIG. 4a illustrates the flanks 4 and 7 of two opposing flank surfaces with approximately constant spacing a. This can be achieved with an arcuate curvature of the flanks 4 and 7 in that the centers of the two curvature arcs are located in the same point.

The flanks 4 and 7 in FIG. 4b have a smallest spacing m at about half the height, while they have a largest spacing d at the lower or upper edge. This is achieved by an offset of the centers of curvature of the arcs along the curvature median relative to the flanks 4 and 7, whereby the flank arc of the flank 7 has the smaller diameter than the flank arc of the flank 4.

FIG. 4c finally shows a flank pairing 4 and 7 with the centers of the flank arcs being offset relative to the curvature median. This results in that, for example, the smallest spacing d1 is achieved in the region of the upper edge and the largest spacing d2 is achieved in the region of the lower edge.

It has been found that the grooved profile in accordance with the aforementioned is especially well suited for shafts or hubs with a diameter of 20 mm to 200 mm and a groove number between 2 and 60 grooves or teeth. The grooves thereby have a height h between 1 mm and 10 mm. The curvature is selected in such a way that a median flank play a of 0.02 mm to 0.10 mm is achieved in the at rest condition between the grooves of the shaft and the hub. The radius of the curvature for an arcuate curvature is preferably selected to be 1 to 40 times the groove height h. When the centers of the curvature arcs are spaced apart, the center of the larger curvature arc is preferably offset by one quarter to twice the radius of the smaller curvature arc.

The invention claimed is:
1. A form fitting hub-shaft connection comprising:
a hub and a shaft, each having splines defined by flanks which are structured and arranged as opposing flanks, the hub and shaft defining a groove profile having a groove profile height;
at least one of the hub and the shaft having a thin wall hollow profile which is internally and externally splined such that a wall thickness of the thin wall hollow profile in the at least one of the hub and the shaft is smaller than the groove profile height; and at least one of the opposing flanks is one of curved and arc-shaped along its length in cross section, such that a varying play along the at least one of the opposing flanks exists between these opposing flanks along their lengths in cross section, wherein the at least one of the opposing flanks of the at least one of the hub and the shaft having the thin wall hollow profile is elastically deformable upon at least one of an increasing rotational speed and an increasing load, to increase a contact length along its length in cross section and to increase contact area between the opposing flanks.

2. The grooved profile of claim 1, wherein the groove profile further comprises an essentially trapezoid cross-section.

3. The grooved profile of claim 1, wherein both of the opposing flanks are one of curved and arc-shaped in cross-section in a same direction.

4. The grooved profile of claim 1, wherein the at least one of the opposing flanks is one of curved and arc-shaped in cross-section extending over at least 50% to 75% of a respective groove profile height.

5. The grooved profile of claim 1, comprising a plurality of groove profiles.

6. The grooved profile of claim 5, wherein the plurality of groove profiles comprises a plurality of hub groove profiles and a plurality of shaft groove profiles.

7. The grooved profile of claim 6, wherein:
the plurality of hub groove profiles further comprise two hub flanks having hub flank curvatures; and
the plurality of shaft groove profiles further comprise two shaft flanks having shaft flank curvatures,
wherein the two hub flanks and the two shaft flanks are structured and arranged to form two pairs of opposing flanks.

8. The grooved profile of claim 7, wherein the hub flank curvatures and the shaft flank curvatures are one of curved and arc-shaped in cross-section in a same direction.

9. The grooved profile of claim 7, wherein the hub flank curvatures are concave towards an inside of the grooved profile and the shaft flank curvatures are convex towards an outside of the grooved profile.

10. The grooved profile of claim 7, wherein the hub flank curvatures and the shaft flank curvatures are arcuate in cross-section and extend over at least 50% to 75% of a respective groove profile height.

11. The grooved profile of claim 7, wherein:
the hub flank curvatures further comprise hub flank curvature centers;
the shaft flank curvatures further comprise shaft flank curvature centers; and
the two pairs of opposing flanks are structured and arranged such that the hub flank curvature center and the shaft flank curvature center of a respective pair of opposing flanks are one of positioned radially spaced apart, and positioned arbitrarily offset and spaced from one another.

12. The grooved profile of claim 1, wherein the varying play is between about 0.02 mm and 0.1 mm.

13. The grooved profile of claim 1, wherein each wall thickness of the hub and the shaft in an area of the groove profile is smaller than the groove profile height.

14. A process for the manufacture of a grooved profile for a form fitting hub-shaft connection having a groove profiles according to claim 1, the process comprising:
engaging at least one profile roll or roller having a profiled cross-section shaped according to the groove profile with a surface of a hub or a shaft.

15. The process according to claim 14, wherein the engaging is a periodic impacting engaging.

16. A telescopic pipe having a grooved profile for articulated shafts comprising:
an inner and outer pipe, each having splines defined by flanks which are structured and arranged as opposing flanks, the inner and outer pipes defining a groove profile having a groove profile height;
at least one of the inner and outer pipe having a thin wall hollow profile which is internally and externally splined such that a wall thickness of the thin wall hollow profile in the at least one of the hub and the shaft is smaller than the groove profile height; and
at least one of the opposing flanks is one of curved and arc-shaped along its length in cross section, such that a varying play along the at least one of the opposing flanks exists between these opposing flanks along their lengths in cross section,
wherein the at least one of the flanks of the at least one of the hub and the shaft having the thin wall hollow profile is elastically deformable upon at least one of an increasing rotational speed and an increasing load, to increase a contact length along its length in cross section and to increase contact area between the opposing flanks.

17. The telescopic pipe of claim 16, wherein the groove profile further comprises an essentially trapezoid cross-section.

18. The telescopic pipe of claim 16, wherein both of the opposing flanks are one of curved and arc-shaped in cross-section in a same direction.

19. The telescopic pipe of claim 16, wherein the at least one of the opposing flanks is one of curved and arc-shaped in cross-section extending over at least 50% to 75% of a respective groove profile height.

20. The telescopic pipe of claim 16, further comprising a plurality of groove profiles.

21. The telescopic pipe of claim 20, wherein the plurality of groove profiles comprises a plurality of outer pipe groove profiles and a plurality of inner pipe groove profiles.

22. The telescopic pipe of claim 16, wherein:
the plurality of inner pipe groove profiles further comprise two inner pipe flanks having inner pipe flank curvatures,
the plurality of outer pipe groove profiles further comprise two outer pipe flanks having outer pipe flank curvatures, and
the two inner flanks and the two outer flanks are structured and arranged to form two pairs of opposing flanks.

23. The telescopic pipe of claim 22, wherein the inner pipe flank curvatures and the outer pipe flank curvatures are one of curved and arc-shaped in cross-section in a same direction.

24. The telescopic pipe of claim 22, wherein the inner pipe flank curvatures are convex towards an outside of the grooved profile and the outer pipe flank curvatures are concave towards an inside of the grooved profile.

25. The telescopic pipe of claim 22, wherein the inner pipe flank curvatures and the outer pipe flank curvatures are arcuate in cross-section and extend over at least 50% to 75% of a respective groove profile height.

26. The telescopic pipe of claim 22, wherein:
the inner pipe flank curvatures further comprise inner pipe flank curvature centers;

the outer pipe flank curvatures further comprise outer pipe flank curvature centers; and the two pairs of opposing flanks are structured and arranged such that the inner pipe flank curvature center and the outer pipe flank curvature center of a respective pair of opposing flanks are one of positioned radially spaced apart, and positioned arbitrarily offset and spaced from one another.

27. The telescopic pipe of claim 16, wherein the varying play or spacing is between about 0.02 mm and 0.1 mm.

28. The telescopic pipe of claim 16, wherein the inner pipe and the outer pipe are structured and arranged as hollow bodies with approximately even wall thicknesses.

\* \* \* \* \*